United States Patent
Bhoovaraghavan (10) Patent No.: US 8,610,731 B2
(45) Date of Patent: Dec. 17, 2013

(54) DYNAMIC GRAPHICS PIPELINE AND IN-PLACE RASTERIZATION

(75) Inventor: Mukundan Bhoovaraghavan, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 12/432,775

(22) Filed: Apr. 30, 2009

(65) Prior Publication Data

US 2010/0277486 A1    Nov. 4, 2010

(51) Int. Cl.
    *G06T 1/20*    (2006.01)
(52) U.S. Cl.
    USPC ............................ 345/522; 345/501; 345/506
(58) Field of Classification Search
    None
    See application file for complete search history.

(56) References Cited

U.S. PATENT DOCUMENTS

| | | | |
|---|---|---|---|
| 6,026,239 A | 2/2000 | Patrick et al. | |
| 6,289,364 B1 | 9/2001 | Borg et al. | |
| 6,697,063 B1 * | 2/2004 | Zhu ................................ | 345/421 |
| 6,900,803 B2 | 5/2005 | Shehane et al. | |
| 7,015,909 B1 * | 3/2006 | Morgan III et al. ........... | 345/426 |
| 7,268,786 B2 * | 9/2007 | Hutchins et al. .............. | 345/522 |
| 7,379,067 B2 | 5/2008 | Deering et al. | |
| 7,379,070 B2 | 5/2008 | Sirois et al. | |
| 2004/0189668 A1 * | 9/2004 | Beda et al. ..................... | 345/619 |
| 2005/0273785 A1 * | 12/2005 | Kass ............................ | 718/100 |
| 2006/0242275 A1 * | 10/2006 | Shapiro ........................ | 709/220 |
| 2008/0001956 A1 | 1/2008 | Markovic et al. | |
| 2009/0153540 A1 * | 6/2009 | Blinzer et al. ................ | 345/212 |
| 2010/0013842 A1 * | 1/2010 | Green et al. .................. | 345/522 |
| 2010/0118038 A1 * | 5/2010 | Labour et al. ................ | 345/522 |

OTHER PUBLICATIONS

Tom McReynolds and David Blythe, "Advanced Graphics Programming Techniques Using OpenGL", SIGGRAPH '99 Course, 1999.*
Tom McReynolds and David Blythe, "Advanced Graphics Programming Using OpenGL", 2005, Morgan Kaufmann Publishers.*
Strom, et al., "Graphics for the Masses: A Hardware Rasterization Architecture for Mobile Phones", Retrieved at <<http://citeseerx.ist.psu.edu/viewdoc/summary?doi=10.1.1.1.7107>>, pp. 8, ACM Trans. Graphics, vol. 22, No. 3, pp. 801-808, Jul. 2003.
Pulli, et al., "Designing Graphics Programming Interfaces for Mobile Devices", Retrieved at <<http://ieeexplore.ieee.org/stamp/stamp.jsp?arnumber=1528436&isnumber=32639>>, IEEE Computer Society, Nov./Dec. 2005, pp. 66-75.

(Continued)

*Primary Examiner* — Kee M Tung
*Assistant Examiner* — Sing-Wai Wu
(74) *Attorney, Agent, or Firm* — Chin IP, PLLC; David Chin (57) ABSTRACT

A pluggable graphics system is described herein that leverages high-end graphical capabilities of various mobile devices while keeping overhead for handling the variations to a negligible level. The pluggable graphics system breaks a graphics pipeline into functional blocks and includes base templates for handling different device capabilities for each functional block. During execution, based on capabilities of the device, the system composes appropriate functional blocks together through just-in-time (JIT) compilation to reduce runtime overhead in performance-sensitive code paths. The functional blocks include code designed to perform well with a particular set of hardware capabilities. In addition, for hardware platforms with large registers, the system provides advanced in-place blending that avoids wasteful memory accesses to reduce blending time. Thus, the pluggable graphics system abstracts differences in hardware capabilities from software applications and utilizes routines designed to perform well on each type of hardware.

20 Claims, 7 Drawing Sheets

(56) References Cited

OTHER PUBLICATIONS

"Graphics Modes and Color Registers", Retrieved at <<http://www.atariarchives.org/agagd/chapter1.php>>, Feb. 17, 2009, pp. 10.

TOR2K, "MFC D3D Application: Direct3D Tutorial Part I", Retrieved at <<http://www.codeproject.com/KB/cpp/mfcd3d.aspx>>, Oct. 4, 2006, pp. 11.

* cited by examiner

DYNAMIC GRAPHICS PIPELINE AND IN-PLACE RASTERIZATION

BACKGROUND

Contemporary browsers and other applications allow plug-ins, which in general comprise hosted software code that interacts with the hosting browser/application to provide additional functionality. One reason for using plug-ins is to increase security; the hosting browser limits the actions that the hosted code (which is generally untrusted) can perform. The Internet has become very dangerous, with malicious websites often attempting to cause a user to download and run harmful code that may damage the user's computer system or destroy the user's data. Thus, web browsers often include restrictions on the code that can run, and the plug-ins that can perform actions on the user's computer system. Plug-ins increase the size of the sandbox provided by the browser, because they allow more functionality on the web while decreasing the number of untrusted applications installed. One such plug-in is Microsoft® Silverlight™, which provides a platform that allows application developers to create rich web applications hosted in the browser that typically include animation, vector graphics, and/or media (e.g., audio/video) content playback. Another example plug-in is Adobe® Flash™.

Mobile devices, such as cell phones and MP3 players, traditionally have had limited graphics capabilities. Early devices were limited to monochrome, two-dimensional graphics for displaying text and simple icons. Later devices added color, but advanced graphics (e.g., three-dimensional rendering, transparency) were still beyond the capabilities of most mobile devices. Not only are the central processing units (CPUs) of many modern mobile devices catching up with desktop counterparts, some mobile devices include graphics processing units (GPUs).

Unfortunately, mobile devices have varying CPU and GPU capabilities. Software designed to run on various mobile devices may operate with a wide variety of hardware support. For example, some mobile devices on which the software runs may not have a GPU. As another example, the CPU of some mobile devices may not include advanced graphical instructions sets, such as Single Instruction Multiple Data (SIMD) extensions. While implementing graphical applications for these constrained devices, application developers often target the least common denominator, leading to slow progress of mobile applications. When implementing presentation middleware like Microsoft Silverlight, targeting the least common denominator leads to poor performance on high-end devices. On the other hand, supporting different capabilities on different devices leads to a more complex runtime of larger size for handling each of the variations.

In addition, as mobile device CPU and GPU capabilities have increased, the limitations of other parts of the devices have become bottlenecks. For example, mobile device bus speeds are often a fraction of their desktop counterparts. While a modern mobile device can process data as fast as desktop computers of several years ago, the device often cannot read and write data from memory fast enough to keep the CPU and GPU busy or utilize these components to their full potential.

SUMMARY

A pluggable graphics system is described herein that leverages high-end graphical capabilities of various mobile devices while keeping overhead for handling the variations to a negligible level. The system allows applications developers to write application code against a common runtime using advanced graphical operations, while isolating the application code from the differences of various hardware platforms. The pluggable graphics system breaks a graphics pipeline into functional blocks and includes base templates for handling different device capabilities for each functional block. During execution on a mobile device, based on capabilities of the device, the system composes appropriate functional blocks together through just-in-time (JIT) compilation to reduce runtime overhead in performance-sensitive code paths. The functional blocks include code designed to perform well with a particular set of hardware capabilities. In addition, for hardware platforms with large registers, the system provides advanced in-place blending that avoids wasteful memory accesses to reduce blending time. Thus, the pluggable graphics system abstracts differences in hardware capabilities from software applications and utilizes routines designed to perform well on each type of hardware.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A pluggable graphics system is described herein that leverages high-end graphical capabilities of various mobile devices while keeping overhead for handling the variations to a negligible level. The system allows applications developers to write application code against a common runtime using advanced graphical operations, while isolating the application code from the differences of various hardware platforms. The pluggable graphics system breaks a graphics pipeline into functional blocks and includes base templates for handling different device capabilities for each functional block. For example, one functional block may perform rendering and rasterization. During execution on a mobile device, based on capabilities of the device, the system composes appropriate functional blocks together through just-in-time (JIT) compilation to reduce runtime overhead in performance-sensitive code paths. In some embodiments, the system abstracts the differences of the host CPU for a full software-based drawing at the rasterization stage. The functional blocks include code designed to perform well with a particular set of hardware capabilities. For example, one functional block for blending colors is designed to avoid memory access overhead by performing CPU or GPU register-based color blending with fewer memory accesses. By avoiding memory accesses, the functional block achieves blending in time comparable to devices with faster bus and memory speeds. Thus, the pluggable graphics system abstracts differences in hardware capabilities from software applications and utilizes routines designed to perform well on each type of hardware.

Presentation middleware can be viewed in two parts, namely, the object model part that exposes the individual graphics element to a programming model/markup system to manipulate the properties and the graphics stack part that receives a set of geometries (represented as complex shapes with outlines represented by a series of curves and lines) and corresponding color data, which is used to fill the outlines to complete the element's visual representation. The process of converting the shapes outline path representation and the color data to a bitmap involves two stages: rendering and rasterization. Rendering flattens the series of curves and lines to form a complex polygon. Rasterization scan converts the complex polygon to produce spans and processes the individual spans with the color information to calculate individual pixel colors. While the rendering stage is computation intensive to produce the line segments, on a system where the computations are performed in fixed point the cost is relatively low, and because of the support for integer arithmetic on most processors additional handling is rarely needed for this stage. Even if the device has floating point hardware, there are some primitives that may benefit from integer operations, such as text processing that can be handled in fixed point without causing overflow errors.

The rasterization stage involves a fair amount of memory-bound calculation (depending on brush types used) for individual pixels and is memory access intensive. Depending on a processor's native register width and support for advanced instructions like SIMD instructions, it is possible to process multiple pixels in registers with fewer memory reads and writes. However, this capability cannot be guaranteed on mobile devices with a wide variation in capabilities. If a system makes assumptions about device capabilities for such basic operations like rendering a simple graphics primitive, the system will limit the ability of middleware built using the system to target a wide range of devices.

The pluggable graphics system breaks the rasterization stage into multiple functional blocks for each brush type and creates template code for each target device capability variation. Following are several examples of device capability variations that the system can consider to arrive at the functional block definition and the architecture for the graphics stack: 1) existence of a Floating Point Unit (FPU), 2) support for SIMD instructions, 3) memory bus speed limitations, and 4) existence of cache and cache behavior. Some of these capabilities are detectable at runtime, such as through CPU instructions. When an application invokes the system, the system determines the appropriate functional block or blocks that will perform well on the hardware on which the application is running, and composes a graphics stack, or pipeline, using JIT compilation that includes the determined functional blocks. In this way, the application executes as if it had been built with a variation of the system designed specifically for the current hardware.

A common operation and frequent bottleneck on mobile devices is the computation of color of a pixel from a graphical element in the rasterization stage. The system includes one or more functional blocks that improve the performance of this operation by avoiding common but unnecessary condition checks and memory accesses that are slow. Since rasterization performs the color computation for each pixel, avoiding unnecessary condition checks and memory accesses provides a considerable level of performance improvement. In addition, by utilizing the JIT compilation model described herein, the system can avoid unnecessary condition checks within the graphics pipeline (e.g., eliminating checks that perform different behavior based on processor capabilities).

Figure 1:
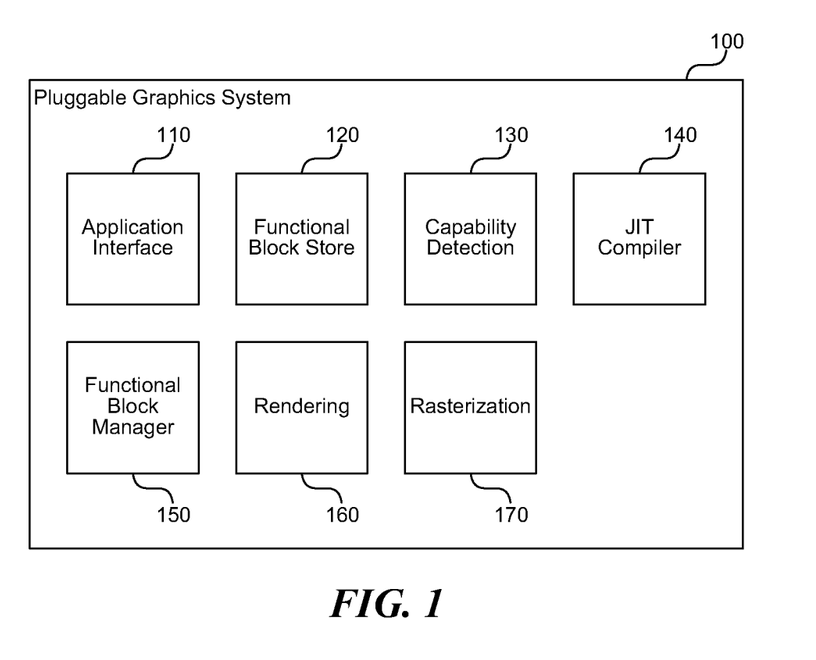
FIG. 1 is a block diagram that illustrates components of the pluggable graphics system, in one embodiment.

FIG. 1 is a block diagram that illustrates components of the pluggable graphics system, in one embodiment. The system 100 includes an application interface 110, a functional block store 120, a capability detection component 130, a JIT compiler component 140, a functional block manager 150, a rendering component 160, and a rasterization component 170. Each of these components is described in further detail herein.

The application interface 110 provides an object model through which applications define and manipulate graphical elements. For example, the application interface 110 may provide a three-dimensional rendering application programming interface (API) through which applications manipulate graphical shapes (e.g., spheres, cubes, and so forth). The system 100 may be implemented as a middleware platform, such as Microsoft Silverlight, and the application interface 110 defines the boundary between an application and the platform. The platform defines a set of operations that the application can perform.

The functional block store 120 is a data store that provides persistent storage of one or more blocks of code for processing graphical elements. The data store may include a database, file, executable module, and so forth. The abstraction of functional blocks can extend to any process within the graphics pipeline, including rendering (e.g., creating an abstraction over GPU accelerated immediate mode rendering versus software mode rendering) and rasterization. A functional block is a block of stateless code that is generated either at compile time or at runtime, which implements a particular functional block interface fulfilling a given responsibility/phase in the overall graphics engine. Each functional block that implements a given interface may have a set of expectations on the input context with respect to the target hardware, execution environment, and parameters. The invocation condition for a functional block is determined at runtime. The graphics engine will invoke the functional block through a pointer to the functional block interface. So, prior to invocation the engine initializes the interface pointers with an appropriate set of functional block implementations. Some of the functional blocks are fully generated during build time, while some are generated through composing different template blocks to form a concrete functional block during runtime (e.g., using JIT compilation).

The capability detection component 130 determines the capabilities of a particular device on which the system executes. For example, the component 130 may determine the CPU type of the device, whether the device includes a GPU, whether the CPU supports SIMD instructions, and so forth. Based on the detected capabilities, the system retrieves the appropriate functional blocks from the functional block store 120, JIT compiles any blocks that are compiled at run time, and invokes the functional block manager 150 to handle invocation of functional blocks. The capability detection component 130 may determine capabilities by executing detection methods (e.g., calling the CPUID instruction) or may receive information from an application or other external source (e.g., an operating system) that provides an indication of device capabilities.

The JIT compiler component 140 compiles code for functional blocks assembled at run time. Some functional blocks may be entirely composed of JIT compiled code, while others may have parts compiled at build time and parts compiled at compile time. In general, it is helpful to compile as much as possible at build time to avoid overtaxing an already low powered mobile device. However, compiling at run time allows information about the device to be included in the compilation so that, for example, hardware-testing conditional statements can be removed in favor of code that only covers the particular device. After functional blocks are compiled, the JIT compiler component may maintain an index into a list of methods that are JIT compiled. The functional block manager 150 may use this index to locate JIT compiled functions.

The functional block manager 150 determines which functional block the system calls to carry out a particular function. The functional block manager 150 provides an abstraction to maintain a portable system. For example, one build environment/feature may use runtime code generation while another uses build time code generation. The functional block manager abstracts how the functional block is constructed and provides a pointer to functional block code based on the requested parameters. The component 150 maintains a global table of function pointers (to run-time generated and build-time generated functions). The functional block manager 150 acts as an interface between rasterization and the set of functional blocks to cover different device-specific implementations. The system indexes build-time generated methods through function pointers resolved during link time and are stored as constant values in a functional block index table. Brush span objects that choose functional blocks based on one or more conditions can index into this table to locate an appropriate functional block.

The rendering component 160 invokes one or more determined functional blocks to render graphical elements. Rendering may include converting object model graphical elements to shapes, flattening shapes, and so forth. The rendering component 160 places application data in a format expected by the rasterization component 170 to complete display of the application data.

The rasterization component 170 invokes one or more determined functional blocks to rasterize graphical elements. Rasterization includes applying brushes to generate colors for each pixel and applying blending to merge the results of multiple layers having different colors and/or brushes. The rasterization component may include one or more in-place blending functional blocks as described further herein that perform rasterization using fewer memory accesses. The in-place blending functional blocks use available device registers to overcome the performance penalty of slow access to memory, particularly where memory would be accessed thousands of times to process each pixel of a high-resolution display. Each pixel would typically be accessed more than a dozen times. Put together for the whole display traditional systems perform many reads and writes. For example, considering a display size of 640×480, the number of reads and writes will be in the millions, so saving a few cycles per pixel has a large impact on the ability to use advanced graphics (particularly when the display area is often refreshed 25 times or more per second).

The computing device on which the pluggable graphics system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

The pluggable graphics system provides a variety of brushes that an application can use to paint graphical elements. For example, the system may provide a solid color brush, gradient fill colors (linear, radial, and focal), an image brush, a layer brush, and so forth. The system abstracts each function that computes the color of a pixel due to a brush into a separate functional block. Mathematically, this can be reduced to f(x, y, T, P), where f( ) defines how the color value is computed for a given pixel position (x, y), transform T, and brush parameters P (which vary with brush, e.g., an image is used as a parameter for an image brush, while a single color value is used as a parameter for a solid brush). Due to the nature of the brush, there are cases where a base computed value of f(x, y, T, P) can be used for f(x+dx, y, T, P) with little or no extra set of computation. Thus, when the system can process a sequence of pixels together, the system can reuse the computation to increase performance.

For multiple graphics elements that overlap in a scan line where there is transparency set for an element through an alpha channel, applications expect the computed colors to be blended together based on the transparency. For example, a 50% blue circle on top of a solid red square will appear to have a purple color at locations where the two shapes overlap. Generally, rasterization algorithms perform color computations one layer at a time, storing the intermediate result (color computed from spans that lie below the current brush in z-order) in memory and combining the intermediate result with the color and transparency information for the next layer until there are no more layers. This is performed for each pixel and results in a significant number of memory accesses. To avoid this, the pluggable graphics system provides a functional block for each brush that computes the color for a pixel in a CPU or GPU register and directly blends the color onto a target buffer in memory that stores the result. In cases where this is not possible (e.g., nested layers of elements with clipping and group transparency set), the system may emulate the described behavior (in which case additional memory accesses will be incurred but will be localized).

When the system is rasterizing a span containing multiple brushes on top of each other and the span is short (e.g., 1 to 8 pixels wide), the intermediate computation can be performed in the registers (e.g., an SIMD register bank) instead (depending on the level of SIMD support) and then stored back to memory. This provides a significant performance improvement, as the delays due to memory accesses are reduced. In this case, the system may cap the span size at an amount that can be handled by the SIMD implementation (e.g., based on a number and width of registers).

To compute the final color at a given pixel position, the pluggable graphics system blends all the colors of the different shapes that overlap at that position with the specified alpha value. To paint a single scan line of the final output, the system splits the scan line into individual spans where one or more shapes overlap, computes the colors by invoking a color generator method of each brush (the object that represents the color data for each shape), and stores the values in an array that represents the span. The system then blends these colors with the already computed colors from the shape that is just below the current shape. Since the system performs the blend in iterations for as many layers that overlap, the computation generates intermediate data. If the intermediate data is stored in memory, then each layer adds an additional read and write operation for each pixel, thereby adding to the memory access overhead.

In some embodiments, the pluggable graphics system performs the blend operation along with computing the color for each pixel in the span to avoid maintaining a separate color array and to avoid the additional read and write operation touching slower main memory. In this case, the system stores the back color and the current color of the brush in registers and computes the blended value, providing a considerable increase to the overall performance of the operation. When multiple brushes are rendered on top of each other the same solution is extended to maintain the intermediate colors in a set of registers (this is practical on SIMD supported hardware, which typically includes a large set of registers very close to the processing unit) and totally avoid writing back to memory until the final color is computed for the layer. In this case, the number of available registers and the use of some registers as a scratchpad limit the amount of pixel data that can be stored in the registers. To cover pixel spans wider than the limit, the system repeats the same operation in a loop.

Following are example functional blocks provided by the pluggable graphics system, in some embodiments. A RasterizeSpan functional block provides a top-level functional block responsible for computing the final colors for a given span of pixels. This block iteratively calls the GenerateAndBlendColors functional block described herein to compute the blended color after applying each brush. Each brush is represented through an object that abstracts which GenerateAndBlendColors functional block to invoke. The brush parameters are generally setup only once and are updated when the properties affecting the parameters change. While setting up the parameters the corresponding GenerateAndBlendColors method for the brush either is picked up from a pre-JIT compiled list of methods or is generated through composition of base templates through JIT compilation.

In some embodiments, the pluggable graphics system provides two variants of the RasterizeSpan functional block: RasterizeSpanLimitedWidth and RasterizeSpanGeneral. RasterizeSpanLimitedWidth limits the number of pixels processed per span to a preset constant value (e.g., based on the target CPU architecture and implementation). For example, for the ARM SIMD implementation for Cortex processors, the system may set the number of pixels at eight. If a brush can reuse color computation (e.g., propagating already calculated, similar neighboring pixel values), the brush will be limited to this number of pixels after which the computation will be recomputed. To cover for the full range of the current span, the system invokes this method iteratively to fill the range completely. This block reduces the number of memory accesses by using the SIMD register bank as a temporary buffer, avoiding a write back to memory until the computation for the whole span is completed. RasterizeSpanGeneral does not have any limitation on the number of pixels, but writes back the values to memory after computing the blended values, and is generally used where SIMD support is unavailable. The system generates the RasterizeSpan functional block to call either RasterizeSpanLimitedWidth or RasterizeSpanGeneral depending on the hardware capability.

Each brush implements a GenerateAndBlendColors functional block. For brushes whose color is computed in place in the CPU register (e.g., brushes other than layer), the blended color is immediately computed. The input to this method is a RasterizationContext object that carries the following parameters: 1) target pixel block (either a pointer to memory or a reference to an SIMD register bank base, which is a known constant), 2) number of pixels in the span to be computed, 3) X, Y (pixel position), 4) coverage data for brush, and 5) other brush parameters. When the target pixel block parameter is passed to a functional block that is called from RasterizeSpanLimitedWidth, the parameter points to an SIMD register bank and when the parameter is from RasterizeSpanGeneral, the parameter is a pointer to the display/temporary buffer.

The generate colors operation is dependent on the brush type and parameters. There can be one or more implementation of the generate colors operation for a given brush based on the parameters (e.g., an exceptional case for stretching an image without rotation, a fixed point implementation for radial gradient brush based on input parameters, and a generic implementation). Typically the generate colors template part is not divisible further without losing performance. Depending on the cost on the runtime JIT compilation and overall binary size limits, specialization can be made further. The BlendColors block is of three types, namely, PixelSet (or no blend), NormalBlendColor, and BlendColorWithCoverage. These operations expect the back color to be stored in the target pixel block parameter. Only BlendColorWithCoverage uses the coverage value in the RasterizationContext object.

The pluggable graphics system composes functional blocks at either build time or run time. The system can implement build time composition, for example, using C++ template functions. This completely depends on whether the compiler supports the required SIMD intrinsic (in the case of SIMD optimizations) and can effectively use the CPU/SIMD registers across the combined C++ functions. Following is an example template function.

```
template <class Blender>
void BrushType::GenerateAndBlendColors(RasterizationContext& rc)
{
    Blender b;
    int nPixels = rc.nPixels;
    //
    // Compute the brush specific common color generation data here
    // and update rc appropriately
    while (nPixels)
    {
        COLOR color = GenerateColors(rc);
        b.Blend(color, rc);
        -- nPixels;
    }
}
```

For cases where intrinsics/C++ templates cannot be used, the alternate is to use runtime composition, which uses emitter-based code generation or binary code block-based generation. Emitter-based generation (where C macros are used to mimic assembly code to compute the machine code for each instruction to be added to the code block being generated) is costlier but increases maintainability of code and any runtime fix-ups needed. With fix-ups, methods can be specialized to the case being rendered more closely, avoiding any kind of conditional statements. In the binary code block method, the template block is generated during compile time using a compiler/assembler and is inserted into code as a binary data block, which is copied as is. Fix-ups in this case are surgical and difficult to maintain. The system can use the template-based instantiation for mobile scenarios where there is appropriate compiler support, and when a feature not covered through C++ template based composition is added emitter based code generation will be used.

Figure 2:
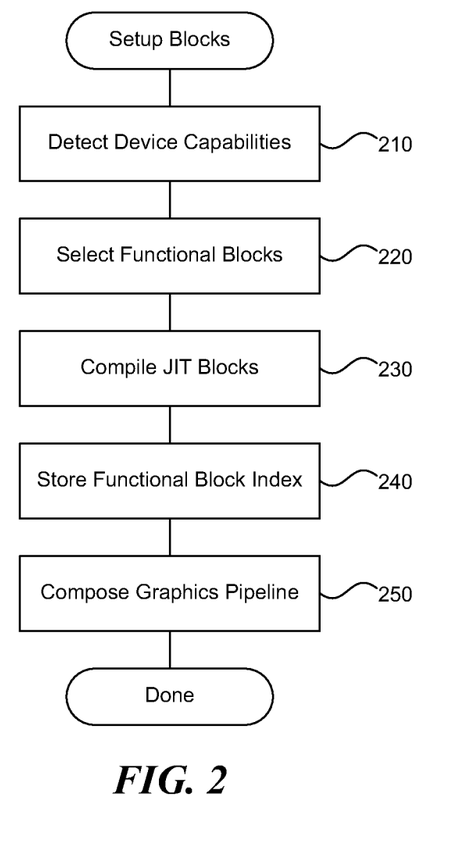
FIG. 2 is a flow diagram that illustrates the processing of the functional block manager component to dynamically compose a graphics pipeline for a particular hardware device, in one embodiment.

FIG. 2 is a flow diagram that illustrates the processing of the functional block manager component to dynamically compose a graphics pipeline for a particular hardware device, in one embodiment. Beginning in block 210, the component detects capabilities of the hardware device that affect graphics processing. For example, the component may determine whether the device supports SIMD instructions, the register layout of the hardware device, and so forth. Continuing in block 220, the component selects functional blocks for performing one or more graphics processing functions based on the detected capabilities of the hardware device. For example if the hardware device supports SIMD instructions, then the component may select a rasterization graphical processing function that invokes SIMD instructions to improve performance.

Continuing in block 230, the component compiles JIT blocks among the selected functional blocks. For example, the component may compile a functional block to remove conditional checks based on hardware versions and replace the conditional checks with a branch appropriate for the hardware device. Continuing in block 240, the component stores a functional block index that contains one or more pointers to the selected and compiled functional blocks. For example, the component may store a table of function pointers that an application can access to render and rasterize graphics using functional blocks designed for the hardware device. Continuing in block 250, the component composes a graphics pipeline based on the stored functional block index that processes graphics operations received from an application using capabilities of the hardware device. After block 250, these steps conclude.

Figure 3:
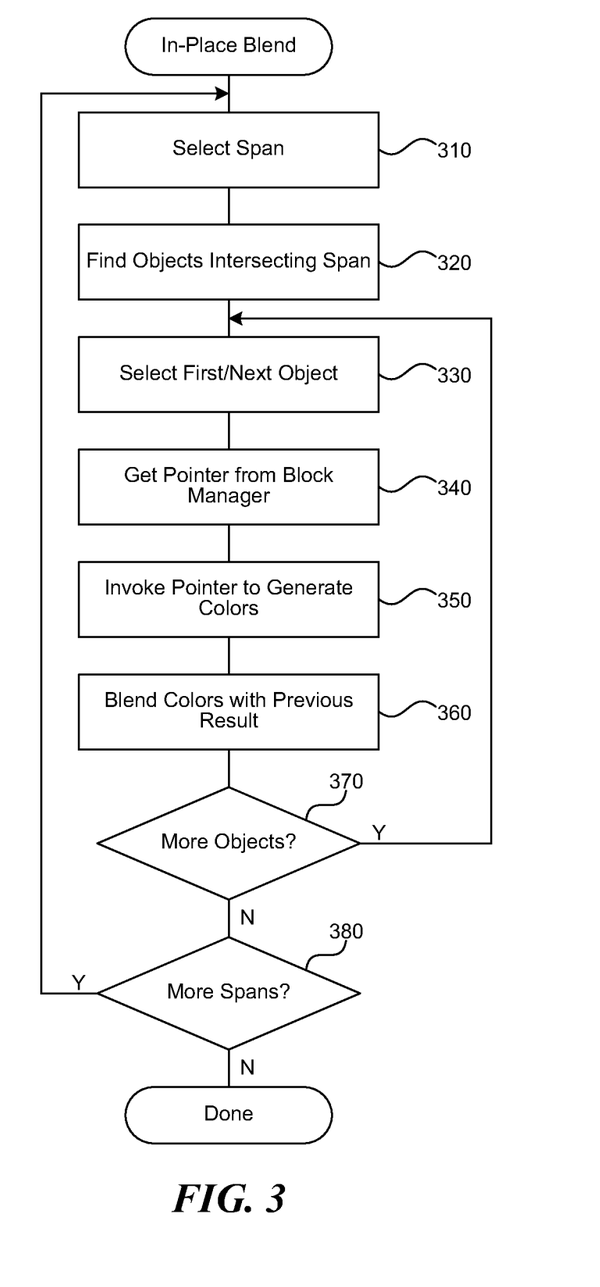
FIG. 3 is a flow diagram that illustrates the processing of the rasterization component using an in-place blend functional block, in one embodiment.

FIG. 3 is a flow diagram that illustrates the processing of the rasterization component using an in-place blend functional block, in one embodiment. Beginning in block 310, the component selects a span of pixels to process. For example, the component may start at the upper left corner of a rectangular display area and work left to right and top to bottom to process each span. The component may determine the size of each span based on a register count and register width of a processor on which the component is executing. Continuing in block 320, the component determines graphical objects intersected by the selected span. For example, the component may inspect an object model to identify graphical objects and based on the coordinates, shape, and size of the objects determine whether the objects overlap the current span.

Continuing in block 330, the component selects the next determined graphical object. For example, the component may traverse a list of identified graphical objects that overlap the currently selected span. Continuing in block 340, the component retrieves a function pointer of a functional block for performing graphics processing on the selected graphical object. For example, the component may query a functional block manager to identify a distinguished block among several functional blocks for performing graphics processing on objects of the selected type, wherein the distinguished block is selected based on the block's performance on a current hardware platform.

Continuing in block 350, the component invokes the retrieved function pointer to determine colors for pixels within the span using a brush associated with the currently selected object. For example, the component may determine the color of a pixel based on a type of the brush and one or more brush parameters and store the result in a processor register. Continuing in block 360, the component uses the retrieved function pointer to blend the determined colors with colors for a previous object intersecting the selected span. For example, the component may retrieve the previous colors from a processor register, combine the colors with the current colors, and store the result back into a processor register. In some embodiments, blocks 350 and 360 are combined to form a single function (e.g., GenerateAndBlendColors described herein) which will update data in registers during generation and blend.

Continuing in decision block 370, if there are more objects that intersect the selected span, then the component loops to block 330 to select the next graphical object, else the component continues at block 380. Continuing in decision block 380, if there are more spans, then the component loops to block 310 to select the next span, else the component completes. After block 380, these steps conclude.

Figure 4:
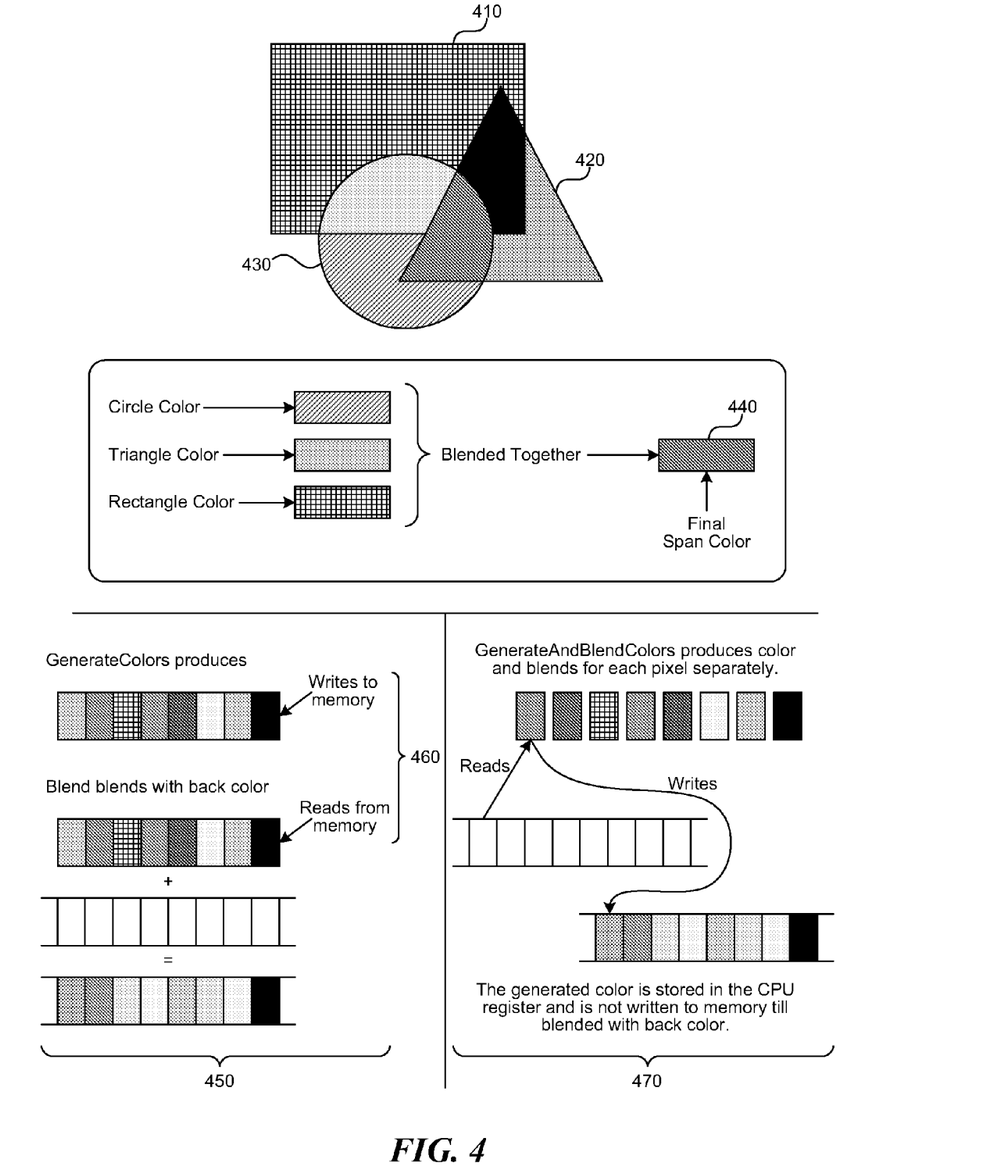
FIG. 4 is a block diagram that illustrates the process of generating and blending colors, in one embodiment.

FIG. 4 is a block diagram that illustrates the process of generating and blending colors, in one embodiment. A graphical display includes three shapes, a rectangle 410, a triangle 420, and a circle 430, each having a different color. The rectangle 410 is opaque, while the triangle 420 and circle 430 each have 50% transparency. The system blends the three colors at each pixel to produce the resulting color 440. To do this, the system generates colors based on the brush at each pixel and blends the colors for the objects that overlap each pixel. Using a first functional block 450, the system first generates colors, writes the result to memory, then blends by reading the result from memory, blending, and writing the result back to memory. The write and read operations 460 cause unnecessary traffic between the processor and memory. In the second functional block 470, the system generates colors and blends in one method, storing intermediate values in registers of the processor. The second functional block 470 does not write to memory until the operation is complete, eliminating the unnecessary write and read operations 460. This is particularly useful when the target bitmap is stored in the GPU video buffer, where the access to memory could be slower than the access to main memory.

Figure 5:
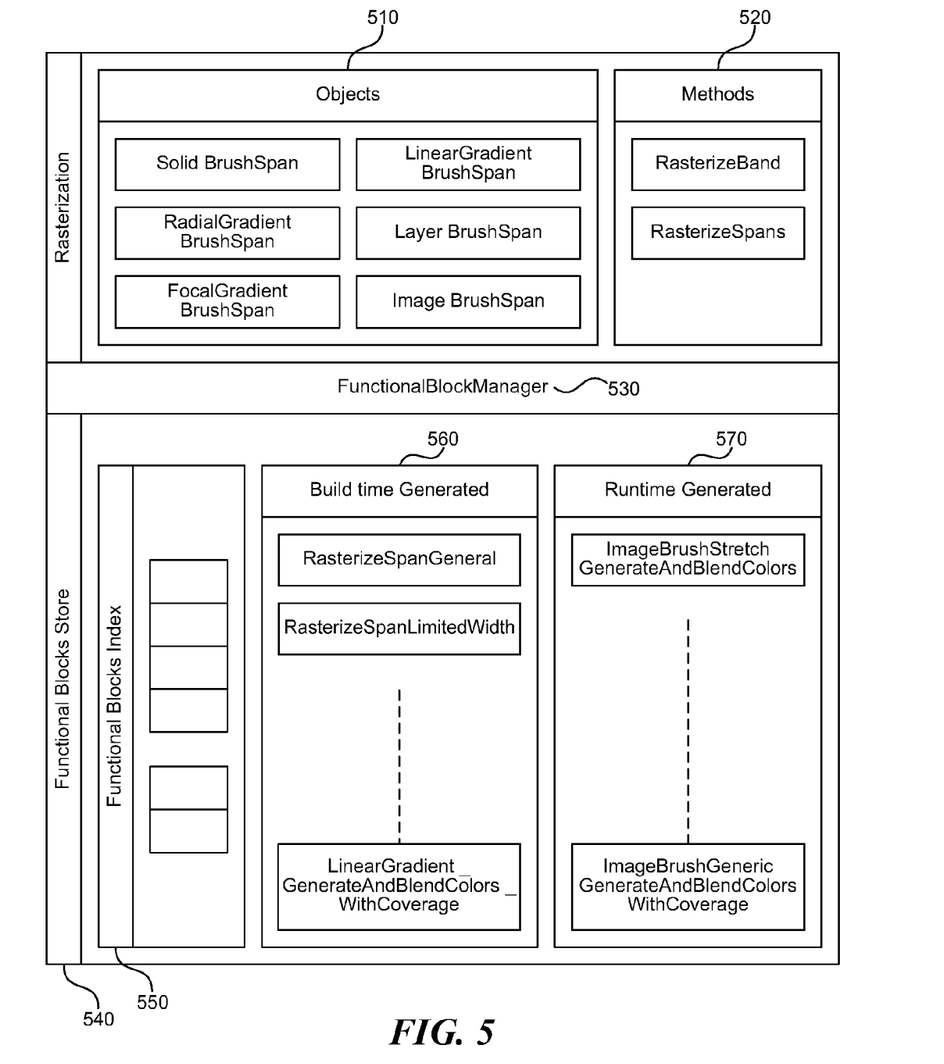
FIG. 5 is a block diagram that illustrates the relationship between platform functions and the dynamic implementation of those functions, in one embodiment.

FIG. 5 is a block diagram that illustrates the relationship between platform functions and the dynamic implementation of those functions, in one embodiment. The system provides high-level, hardware independent objects 510 and methods 520 called to draw different graphical objects. The functional block manager 530 abstracts the implementation by configuring a dynamic implementation based on capabilities of the hardware on which the system executes. The functional block store 540 contains a functional block index 550 that includes function pointers to one or more build time generated functional blocks 560 and run time generated functional blocks 570. The functional blocks 560 and 570 implement hardware-optimized versions of the high-level methods 520.

Figure 6:
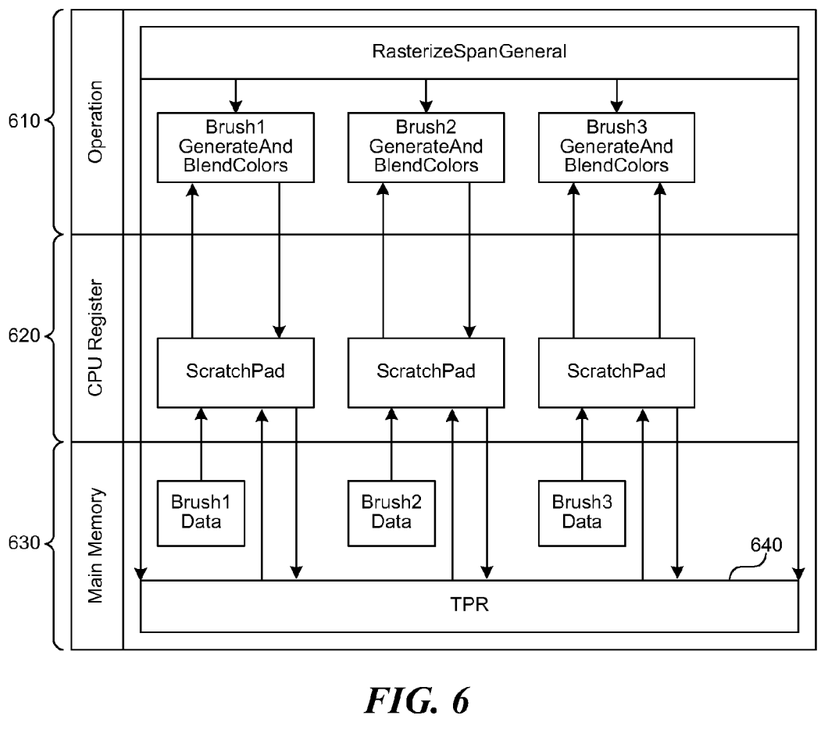
FIGS. 6 and 7 are data flow diagrams that illustrate the flow of data during rasterization in two different functional block implementations.
Figure 7:
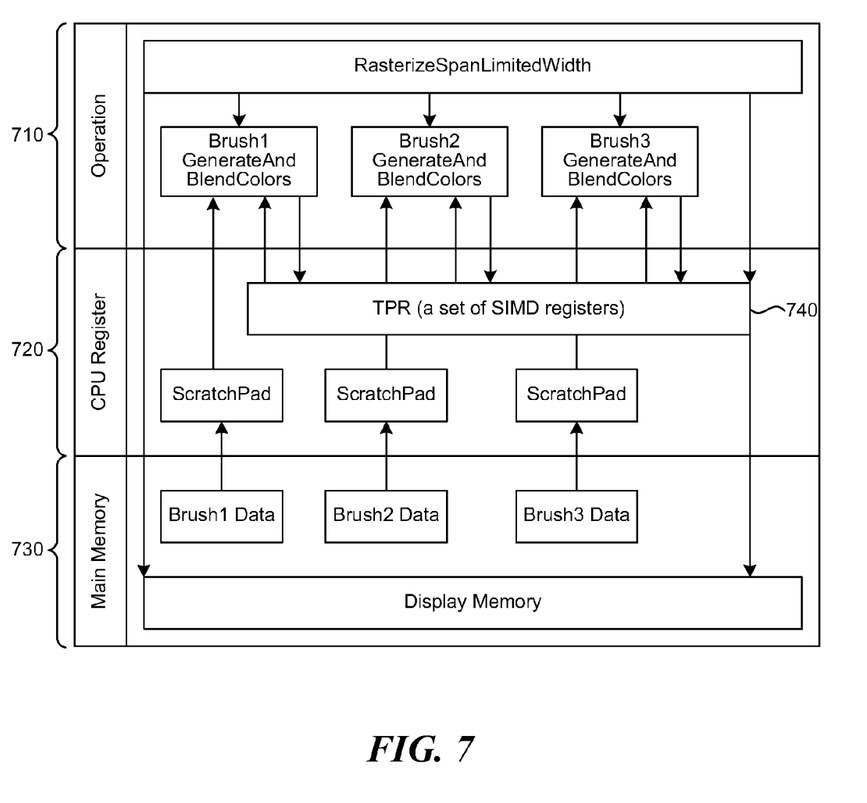

FIGS. 6 and 7 are data flow diagrams that illustrate the flow of data during rasterization in two different functional block implementations. FIG. 6 illustrates rasterization without SIMD register support. The operation 610 uses CPU registers 620 only for a scratchpad and accesses main memory 630 to read and write each set of brush data and color results. Intermediate results are stored in a target pixel range 640 in main memory 630. FIG. 7 illustrates rasterization with SIMD register support. The operation 710 uses CPU registers 720 for both a scratchpad and to store a target pixel range 740 that acts as an intermediate store for rasterization results. The operation 710 may also use the scratchpad registers to calculate the individual pixel values in bulk (all pixels in one shot) or iteratively depending on the number and availability of scratchpad registers. The overall number of accesses shown in FIGS. 6 and 7 are the same, but in FIG. 7 the rasterization is much faster because there are fewer accesses to main memory 730. The system reads brush data and other parameters from main memory 730, and then writes the result to main memory 730. However, intermediate data stays in the CPU registers.

In some embodiments, the pluggable graphics system provides versions of the system for multiple hardware platforms that have already been compiled to provide favorable performance for each particular hardware platform. Thus, rather than the steps described herein of dynamically composing functional blocks when an application invokes the system, a user or application may install an appropriate version of the system once on a particular hardware platform that has already had the functions of the functional block manager and JIT compiler performed on a reference version of the hardware platform. For mobile devices, storage space is often scarce and installing a version selected for the particular hardware platform reduces binary size by removing unnecessary functional block variations that are not applicable to the hardware platform.

In some embodiments, the pluggable graphics system uses floating point processing instead of fixed point processing. Based on the operations supported by the CPU of the hardware device, the system may be able to increase precision using floating point processing. If the CPU supports floating-point operations, then the system can use floating-point operations. Otherwise, the system may fall back to fixed-point calculations.

In some embodiments, the pluggable graphics system uses GPU support for vector graphics to increase performance. GPUs often provide instructions designed to improve vector graphic processing. Rather than selecting an implementation of vector processing in a functional block, for hardware devices with appropriate GPU support, the system may select a functional block that invokes vector-processing instructions of the GPU to perform vector operations.

From the foregoing, it will be appreciated that specific embodiments of the pluggable graphics system have been described herein for purposes of illustration, but that various modifications may be made without deviating from the spirit and scope of the invention. For example, although the system has been described in the context of mobile devices, the system can also be used to speed up processing on desktop computers or other devices. Accordingly, the invention is not limited except as by the appended claims.

I claim:

1. A computer-implemented method for register-based graphics rasterization with a processor, the method comprising:
rasterizing a span of pixels, including:
selecting a span of pixels to process;
determining one or more graphical objects intersected by the selected span;
selecting a first graphical object that intersects the selected span;
retrieving a pointer to a functional block, wherein the functional block is configured to perform graphics processing on the span of pixels, including:
querying, at run-time, a functional block manager; and
receiving, in response to the query, the pointer from the functional block manager, wherein the received pointer points to a block selected by the functional block manager from amongst multiple graphics processing blocks; and
invoking the functional block through the retrieved pointer to perform graphics processing on the span of pixels, including:
determining interim color data for pixels within the selected span based at least in part on a brush operation associated with the first graphical object; and
blending the interim color data with color data representing another graphical object that intersects the selected span, wherein the functional block is configured to retain interim representations of at least a portion of the pixels of the selected span in one or more registers within a register bank of the processor while performing the graphics processing.

2. The method of claim 1 wherein selecting a span comprises determining a size of the span based on a number of registers within the register bank and on a width of registers of the register bank.

3. The method of claim 1 wherein determining one or more graphical objects intersected by the selected span comprises:
identifying the one or more graphical objects; and
determining, based on coordinates, shapes, and sizes of the identified graphical objects, whether the objects overlap the selected span.

4. The method of claim 1 wherein the selected block is selected by the functional block manager based on performance characteristics of a hardware platform on which the graphics are rasterized.

5. The method of claim 1 wherein determining the interim color data comprises:
determining a color of each pixel in the selected span based on a type of the brush operation and one or more parameters for the brush operation.

6. The method of claim 1 wherein determining the interim color data comprises:
determining interim color values for pixels within a range of pixels in a layer; and
storing the interim color values in the one or more registers.

7. The method of claim 1 wherein blending the color data comprises:
retrieving the interim color data from the one or more registers;
combining the interim color data with the color data representing the other graphical object into combined color data; and
storing the combined color data into the one or more registers.

8. The method of claim 1 further comprising rasterizing another span of pixels.

9. A computing device for generating a graphical display, comprising:

a memory and a processor that are respectively configured to store and execute instructions, including instructions that are organized into:
- an application interface configured to provide an interface for defining and manipulating graphical elements;
- a functional block store configured to store multiple functional blocks that are each configured to perform graphics processing on the graphical elements;
- a capability detection component configured to determine one or more capabilities of the computing device;
- a functional block manager configured to select, at run-time, functional blocks from amongst the multiple functional blocks stored in the functional block store based on the determined capabilities of the computing device for:
  - a rendering component configured to render the graphical elements; and
  - a rasterization component configured to rasterize the graphical elements; and
- a compiler component configured to perform a run-time compile of at least a portion of at least one functional block from the functional block store.

10. The system of claim 9 wherein the application interface is further configured to operate within a web browser as a plug-in.

11. The system of claim 9 wherein the functional block store is further configured to store an index of currently selected functional blocks.

12. The system of claim 9 wherein the functional block store is further configured to store multiple functional blocks of stateless code, wherein at least one of the stored functional blocks is a compiled functional block, and wherein at least another of the stored functional blocks is an uncompiled functional block.

13. The system of claim 9 wherein the functional block store is further configured to store functional blocks wherein each functional block implements a given interface and has a set of expectations on an input context with respect to a target hardware execution environment.

14. The system of claim 9, wherein the functional block store is further configured to receive requests to execute one or more of the functional blocks through one or more pointers, and wherein the functional block manager is further configured to provide the one or more pointers based on the determined capabilities of the computing device.

15. The system of claim 9, wherein the capability detection component is further configured to determine whether the computing device supports single instruction multiple data (SIMD) instructions.

16. The system of claim 9, wherein the capability detection component is further configured to invoke the functional block manager to retrieve functional blocks from the functional block store that are appropriate for the device, JIT compile any functional blocks that are to be compiled at run time, and to store an index of the retrieved functional blocks.

17. The system of claim 9, wherein the compiler component is further configured to remove at least one conditional check from at least one functional block that is to be run-time compiled based on the detected capabilities of the computing device.

18. The system of claim 9 wherein the rasterization component is further configured, in response to a determination that the device includes single instruction multiple data (SIMD) registers, to invoke an in-place blending functional block that performs rasterization while retaining intermediate blending data in the SIMD registers.

19. A computer-readable storage medium that stores instructions for configuring a target-hardware-specific graphics processing on a computing device, wherein the instructions enable the computing device to perform actions comprising:
- detecting capabilities of a hardware graphics processing component of the computing device;
- selecting at run-time one or more functional blocks from a collection of functional blocks for performing one or more graphics processing functions based on the detected capabilities of the hardware graphics processing component,
  - wherein each of the one or more functional blocks is a software block that includes an implementation of a graphics processing functionality, and
  - wherein the collection of functional blocks has at least:
    - a first functional block that includes a first implementation of a specific graphics processing functionality that is to be employed for performing the specific graphics processing functionality if the hardware graphics processing component was detected to have a first set of capabilities; and
    - a second functional block that includes a second implementation of the specific graphics processing functionality that is to be employed for performing the specific graphics processing functionality if the hardware graphics processing component was detected to have a second set of capabilities;
- compiling at run-time at least a portion of one of the selected functional blocks;
- generating an index that contains one or more pointers to the selected functional blocks such that the selected functional blocks are invoked in response to a call from an application for one or more graphics processing functionalities provided via the one or more indexed pointers;
- receiving a request for one or more graphics processing functionalities from the application; and
- performing the requested graphics processing functionalities based on the index.

20. The computer-readable storage medium of claim 19, wherein the collection of functional blocks includes one or more functional blocks that provide rendering functionality and one or more functional blocks that provide rasterization functionality.

* * * * *